United States Patent
Orr et al.

(10) Patent No.: US 11,542,145 B1
(45) Date of Patent: Jan. 3, 2023

(54) APPARATUS FOR NITROGENIZING A BEVERAGE

(71) Applicants: Timothy E. Orr, Redding, CA (US); Randy Anderson, Redding, CA (US)

(72) Inventors: Timothy E. Orr, Redding, CA (US); Randy Anderson, Redding, CA (US)

(73) Assignee: TORR INDUSTRIES, INC., Redding, CA (US)

( * ) Notice: Subject to any disclaimer, the term of this patent is extended or adjusted under 35 U.S.C. 154(b) by 315 days.

(21) Appl. No.: 16/886,561

(22) Filed: May 28, 2020

(51) Int. Cl.
| | |
|---|---|
| *B67D 1/04* | (2006.01) |
| *B67D 3/04* | (2006.01) |
| *A23L 2/54* | (2006.01) |
| *B01F 23/20* | (2022.01) |
| *B01F 35/53* | (2022.01) |
| *B01F 23/2361* | (2022.01) |
| *B01F 23/23* | (2022.01) |
| *B01F 27/805* | (2022.01) |

(52) U.S. Cl.
CPC ............... *B67D 1/04* (2013.01); *A23L 2/54* (2013.01); *B01F 23/20* (2022.01); *B01F 35/531* (2022.01); *B01F 23/2361* (2022.01); *B01F 23/2366* (2022.01); *B01F 27/805* (2022.01); *B67D 2001/0481* (2013.01)

(58) Field of Classification Search
CPC ..... B67D 1/04; B67D 2001/0481; A23L 2/54; B01F 23/20; B01F 35/531; B01F 23/2361; B01F 23/2366; B01F 27/805
See application file for complete search history.

(56) References Cited

U.S. PATENT DOCUMENTS

| | | | |
|---|---|---|---|
| 9,610,553 B2* | 4/2017 | Goodson | B01F 35/212 |
| 2007/0199452 A1* | 8/2007 | Dworzak | A47J 31/402 |
| | | | 99/275 |
| 2008/0118946 A1* | 5/2008 | Fabiyi | C02F 3/206 |
| | | | 366/302 |
| 2008/0196593 A1* | 8/2008 | Shrader | A47J 31/32 |
| | | | 99/279 |
| 2015/0017297 A1* | 1/2015 | Vastardis | A23L 33/10 |
| | | | 426/429 |
| 2018/0213824 A1* | 8/2018 | Schacht | B01F 23/2361 |
| 2019/0292033 A1* | 9/2019 | Touchette | A23L 2/54 |

OTHER PUBLICATIONS

Orrr, Timothy, U.S. Appl. No. 17/710,736, filed Mar. 31, 2022.*

* cited by examiner

*Primary Examiner* — Frederick C Nicolas
(74) *Attorney, Agent, or Firm* — Theodore J. Bielen, Jr.

(57) ABSTRACT

An apparatus for nitrogenizing a beverage utilizing a container having a chamber with a plurality of baffles. The container also includes a nitrogen regulator in the form of a collapsible orifice at the base of the container. An agitator in the form of an impeller creates a shear on the beverage during delivery of a stream of nitrogen into the container.

13 Claims, 4 Drawing Sheets

APPARATUS FOR NITROGENIZING A BEVERAGE

BACKGROUND OF THE INVENTION

The present application provides a novel and useful apparatus for nitrogenizing a beverage.

"Cold brew coffee" is often prepared by steeping coffee grounds in cold water. The resulting beverage has achieved notable popularity. Other beverages such as beer, tea, juices, milk, as well as various other alcoholic and non-alcoholic drinks may also be nitrogenized with the apparatus of the present application.

With respect to "cold brew coffee", it is often packaged as a ready-to-drink (RTD) item. As such, the RTD cold brew coffee is either packaged in a can or bottle or distributed "on dispense", i.e. poured via a tap at a place of purchase.

In addition, cold brew coffee prepared and served "on dispense" may also be presented as nitrogenized cold brew coffee. That is to say, plain, cold, unsweetened black coffee is infused or nitrogenized with nitrogen gas. Such a beverage is often referred to as "nitro cold brew" or "nitro coffee". Properly infused nitro coffee changes plain cold brew coffee from its heavy, dark, black state to a lighter colored, near frothy, and creamy beverage that consumers find visually and texturally appealing and desirable. Also, consumers perceive the taste of the nitro coffee as being creamier and sweeter than the typical flat or "still" cold brew coffee. Such change in perceived flavor and texture has become desirable to consumers, including those self-described as non-coffee drinkers.

As an example, Irish beer "Guinness Stout", introduced in 1759, is the most popular nitro infused beer worldwide, selling over 1.8 billion pints per year. Further, nitrogenization, or nitro infusion, has gained popularity for other beverages as well, including tea, lemonade, milk, and various alcoholic and non-alcoholic drinks. As with cold brew coffee, the heretofore described beverages are distributed in RTD formats as well as on tap at restaurants, bars, and coffee shops throughout the world.

Nitrogenized beverages exhibit some similarities to carbonated drinks. However, the process of nitrogenizing and its effect on liquid beverages is much different than carbonation.

Prior art methods of nitrogenizing cold brew coffee and other beverages on dispense have generally been limited to infusing the nitrogen before it is distributed. In certain cases, beverages are infused with nitrogen in a still holding the beverage, followed by dispensing with a specific type of tap faucet, referred to as a "stout faucet". Thus, prior art methods for nitrogenization of a beverage entail infusion of a gaseous nitrogen prior to exiting a tap and then utilizing a special type of faucet to accomplish the egress of such beverage.

Various prior art systems have been proposed to combine gaseous material with liquids. For example, United States Patent Publication 2018/0318777 describes a liquid drink dispensing apparatus in which a gas generating component and a liquid drink dispensing element form an apparatus. The gas generated infuses a liquid drink prior to dispensing.

United States Patent Publication 2018/02113824 shows a technique and method for injecting a gas into a beverage. The beverage is placed into a container and a gas is pumped into a delivery device having a porous end portion to deliver the gas to a liquid.

U.S. Pat. No. 9,801,405 describes a method to prepare and dispense gaseous-infused beverages in which a beverage concentrate is utilized and mixed with a particular gas, such as nitrogen or carbon dioxide. A slow pour faucet is then employed to deliver the infused liquid for use.

European Patent Specification EP2783743 shows a method for processing a fluid in which a gas is sparged into a fluid to form a humid gas. The humid gas is passed from the container into a condenser bag which is cooled, separating the components into a condensed fluid and a dehumidified gas. The condensed fluid is then combined with components or recirculated back to the compartment.

Korean Publication KR1020160099794A teaches an apparatus to produce lotions, drops, gels, ointments, and the like by placing a fluid in a container with an impeller. Dissolved gasses are then added to infuse liquid in the container and produce a fluid with a large amount of nanobubbles.

International Publication WO2018/148843 illustrates the carbonation of a liquid by infusion of carbon dioxide into such liquid and mixing the same with a magnetic mixer.

International Publication WO2018/156361 involves a method of mixing of a first beverage with a second beverage through the use of an external control system to remotely accomplish the same.

The apparatus for the infusion of nitrogen into a beverage and the production of near microscopic bubbles to produce a drink which exhibits superior flavor and visual appeal would be a notable step in the beverage processing industry.

SUMMARY OF THE INVENTION

In accordance with the present application, a novel and useful apparatus for nitrogenizing a beverage is herein provided.

The apparatus of the present application utilizes a container having a chamber for holding the beverage. The container is formed with a base and a side portion that extends outwardly from the base. At least one baffle, and preferably a multiplicity of baffles, are located in the chamber and are positioned along the inside wall portion of the container.

A port or orifice is located in the base of the container to permit the passage of gaseous nitrogen from a source of nitrogen and, thus, allow the entry of nitrogen into the chamber of the container. The port or orifice may be located in a resilient element formed apart of the base of the container such that the flow of nitrogen from the source to the chamber of the container causes deflection of the resilient element and enlargement of the orifice. Such enlargement is a result of the pressure of the nitrogen gas at the port or orifice.

An agitator is also employed in the present apparatus. The agitator may take the form of an impeller, which extends into the chamber of the container and creates a sheer force on the beverage within the chamber of the container.

The agitator is ideally positioned adjacent the port orifice, from which the nitrogen gas is emanating, and adjacent to the at least one baffle.

A first conventional controller regulates the activity of the agitator while a second controller regulates the rate of entry of the gaseous nitrogen through the port or orifice in the base of the container and into the chamber of the same.

A support for the container is also included in the present apparatus and is formed with an injector that communicates with the port or orifice located in the resilient element at the base of the container.

In other words, the support is, thus, positioned against the base of the container when nitrogen is being delivered to the chamber of the container.

It may be apparent that a novel and useful apparatus for infusing gaseous nitrogen from a source into a beverage has been hereinabove described.

It is therefore an object of the present application to provide an apparatus for infusing gaseous nitrogen from a source into a beverage that combines the steps of infusion and dispersion of nitrogen gas into a beverage.

Another object of the present application is to provide an apparatus for infusing gaseous nitrogen from a source into a beverage that may be used to provide a cold brew coffee without the use of a tap, which may require a special spout.

Another object of the present application is to provide an apparatus for infusing gaseous nitrogen from a source into a beverage which provides optimal nitrogenizing after the beverage is dispensed, i.e. a post dispensing nitrogenizing process.

Another object of the present application is to provide an apparatus for infusing gaseous nitrogen from a source into a beverage that utilizes an agitator that may take the form of a conventional high-revolution mixing tool in combination with novel baffles within the chamber of the container to restrict vortex formation and the drawing of ambient air into the container.

Another object of the present application is to provide an apparatus for infusing gaseous nitrogen from a source into a beverage that utilizes an impeller in combination with one or more baffles within a container and eliminates formation of a vortex and ensuing cavitation, preventing aeration of the beverage or liquid by ambient air.

Another object of the present application is to provide an apparatus for infusing gaseous nitrogen from a source into a beverage that eliminates infusion of oxygen and carbon dioxide from the ambient atmosphere into the beverage being infused within a container, simply and effectively Another object of the present application is to provide an apparatus for infusing gaseous nitrogen from a source into a beverage in which the amount of agitation and the rate of delivery of nitrogen into the container are easily controlled at the same time.

Another object of the present application is to provide an apparatus for infusing gaseous nitrogen from a source into a beverage in which a high-speed impeller is employed to create pressure and sheer in the liquid adjacent one or more baffles located in the container.

A further object of the present application is to provide an apparatus for infusing gaseous nitrogen from a source into a beverage which may take the form of coffee, milk products, juices, and the like.

The application possesses other objects and advantages especially as concerns particular characteristics and features thereof which will become apparent as the specification continues.

Figure 1:
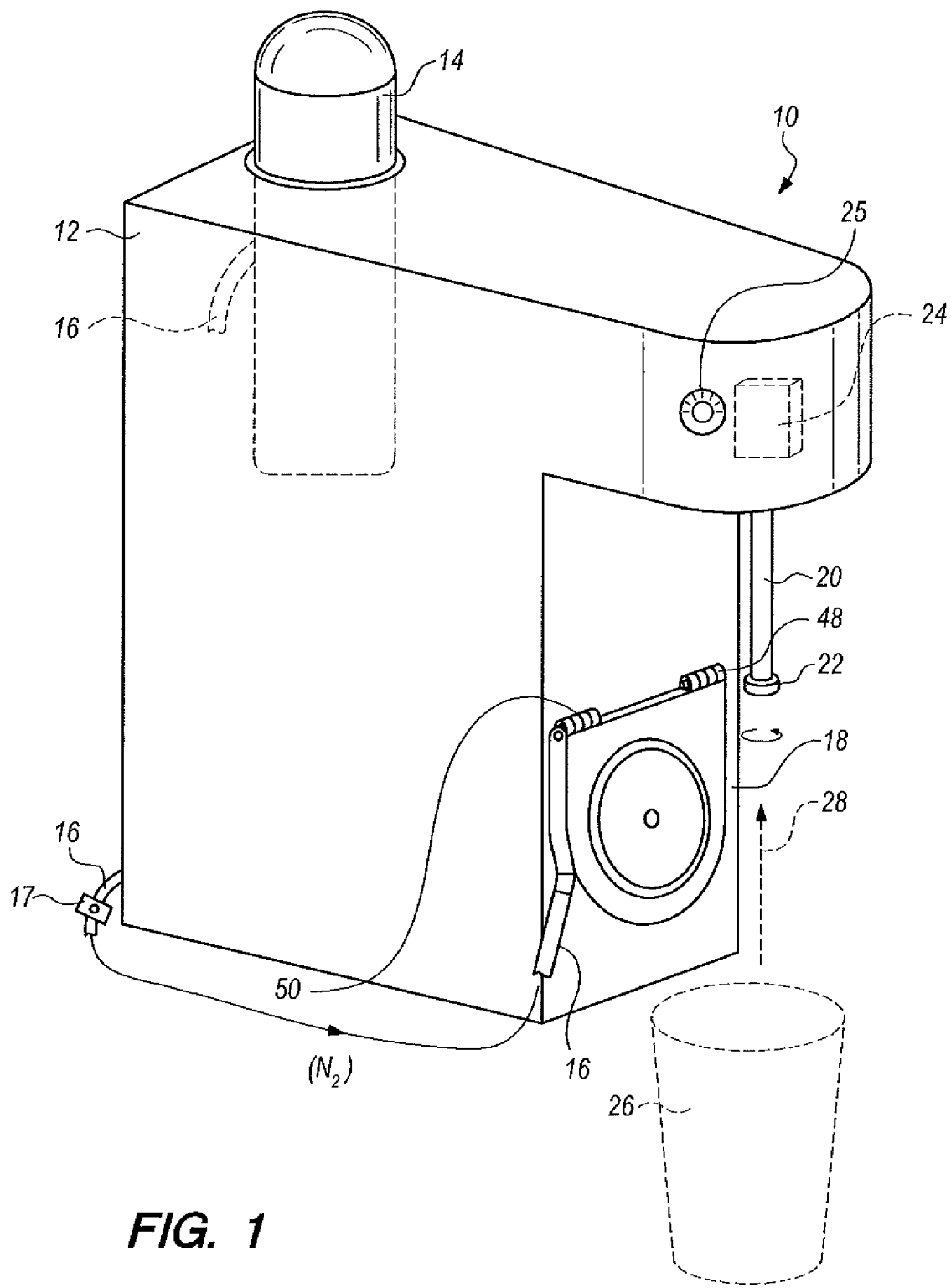
FIG. 1 is a top right perspective view of a portion of the apparatus of the present application having the agitator impeller and nitrogen delivery injector.

For a better understanding of the application, reference is made to the following detailed description of the preferred embodiments thereof which should be referenced to the prior delineated drawings.

DETAILED DESCRIPTION OF THE PREFERRED EMBODIMENTS

Various aspects of the present application will evolve from the following detailed description of the preferred embodiments thereof which should be referenced to the prior delineated drawings.

The apparatus as a whole is depicted in the drawings by reference character 10. The apparatus 10 is intended to infuse or nitrogenize a beverage. In this regard, a housing or casing 12 holds a source of gaseous nitrogen in the form of a canister 14 of conventional configuration. A valve 17 is linked with canister 14 to allow liquid nitrogen to flow through a conduit 16, depicted in phantom and broken configuration on FIG. 1. Apparatus 10 also includes a support 18 which hingedly rotates upwardly and outwardly from casing 12 and may include a spring mechanism. In addition, casing 12 holds a prior art agitator 20 in the form of an impeller having a rotating tip or end 22. A motor 24 for agitator 20 is shown in phantom on FIG. 1 and lies within casing 12. As heretofore stated, agitator 20, impeller tip 22, and motor 24 are of conventional configuration. In addition, motor 24 includes an accessible controller 25 in the form of a rheostat and the like, well known in the prior art.

A container 26 is depicted in phantom on FIG. 1, and as is indicated by arrow 28, is positioned upwardly relative to impeller 20. The positioning and function of the heretofore described elements will be described in greater detail as the specification continues.

Figure 2:
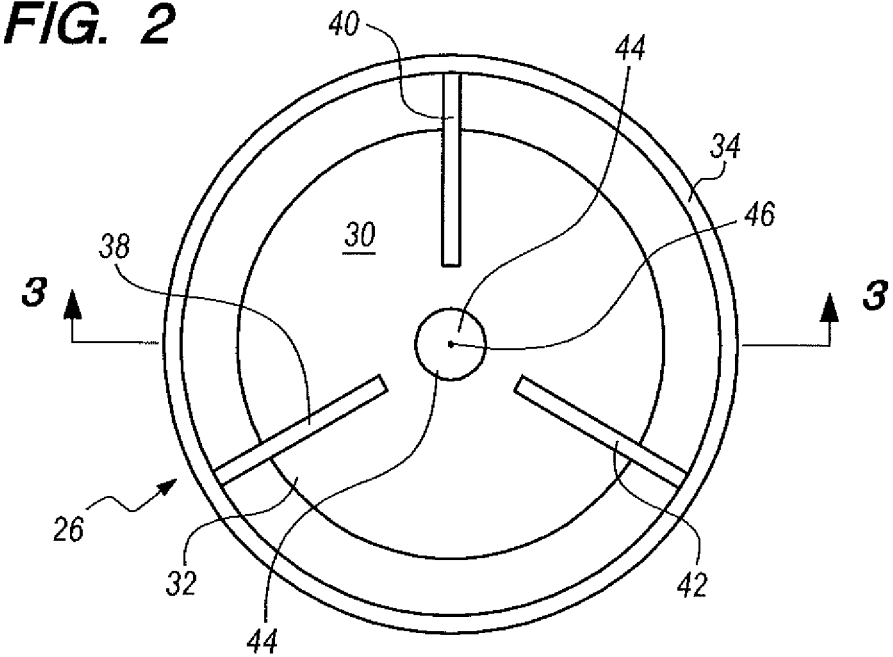
FIG. 2 is a top plan view of the container portion of the apparatus of the present application.
Figure 3:
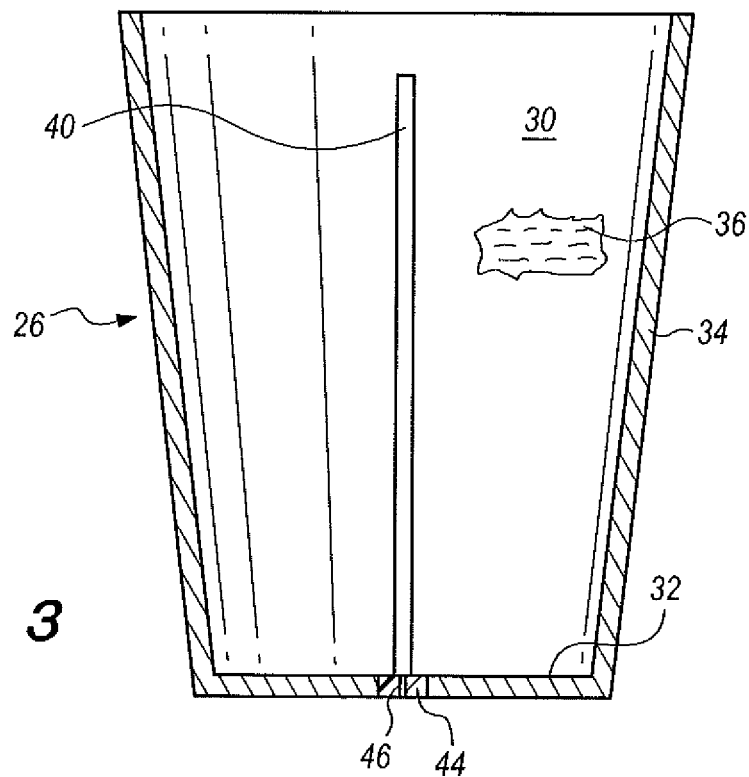
FIG. 3 is a sectional view taken along line 3-3 of FIG. 2.

Turning now to FIG. 2, it may be observed that container 26 is formed with a chamber 30. Chamber 30 is formed by base 32 and side portion 34 which extends outwardly from base 32. Chamber 30 takes the form of an open chamber and is intended to hold a beverage 36 shown partially on FIG. 3. Side portion 34 of container 36 may be of a frusto-conical shape. Container 26 also possesses at least one baffle within chamber 30. As depicted in FIG. 2, baffles 38, 40, and 42 are shown to lie alongside side portion 34 of container 26. Moreover, a resilient element 44 transverses and forms part of base 32 and includes an orifice or port 46 which is more clearly defined in FIG. 5.

Figure 4:
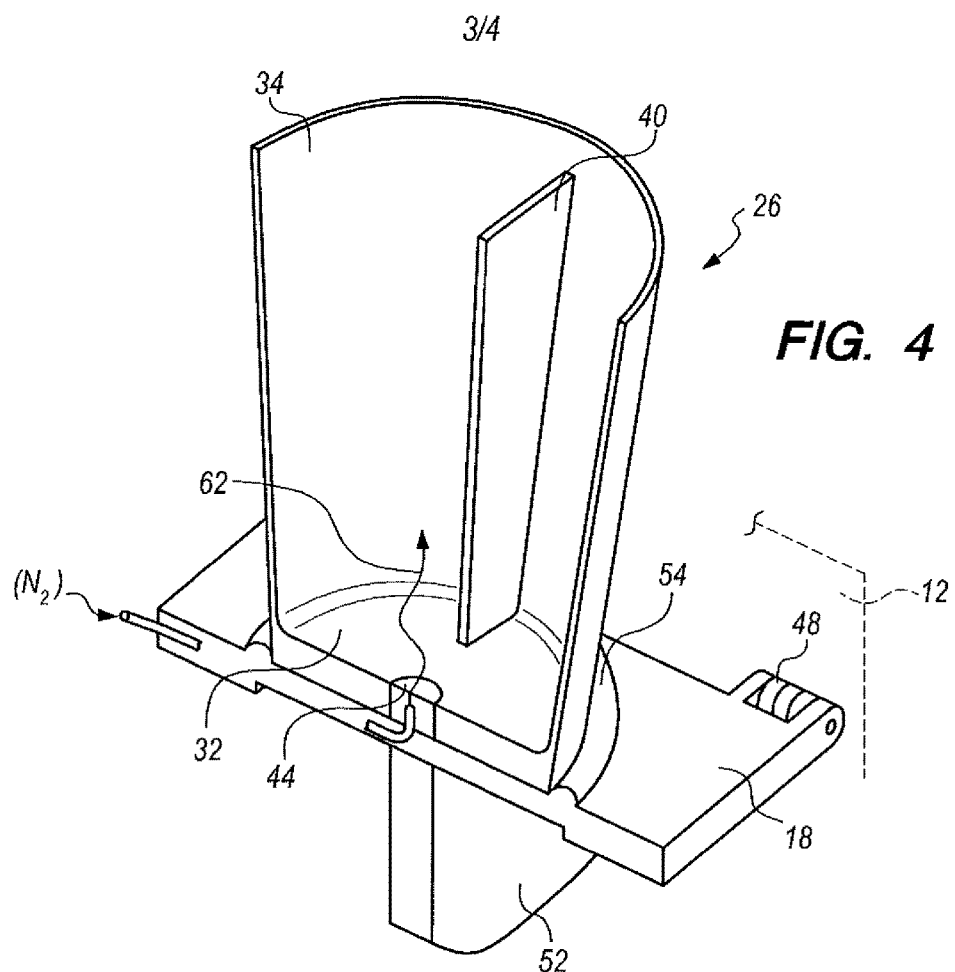
FIG. 4 is a top right perspective view of the container and support portions of the apparatus of the present application.

Viewing generally FIGS. 1, 4, 5 and 6, it should be seen that support 18, which is hingedly attached to casing 12 via hinges 48 and 50, is shown free of casing 12. Hinges 48 and 50 may be spring biased to direct support 18 outwardly from housing 12. A brace 52 may be employed to hold support 18 in a generally horizontal position when port 18 is swing outwardly from casing 12. Optional brace 52 may be detachably connected to casing 12 or rotatably attached thereto. Support 18 is also formed with a disc-shaped depression 54 to position container 26 thereat. As depicted in FIG. 4, container 26 is positioned to accept beverage 36 and agitator 20.

Figure 5:
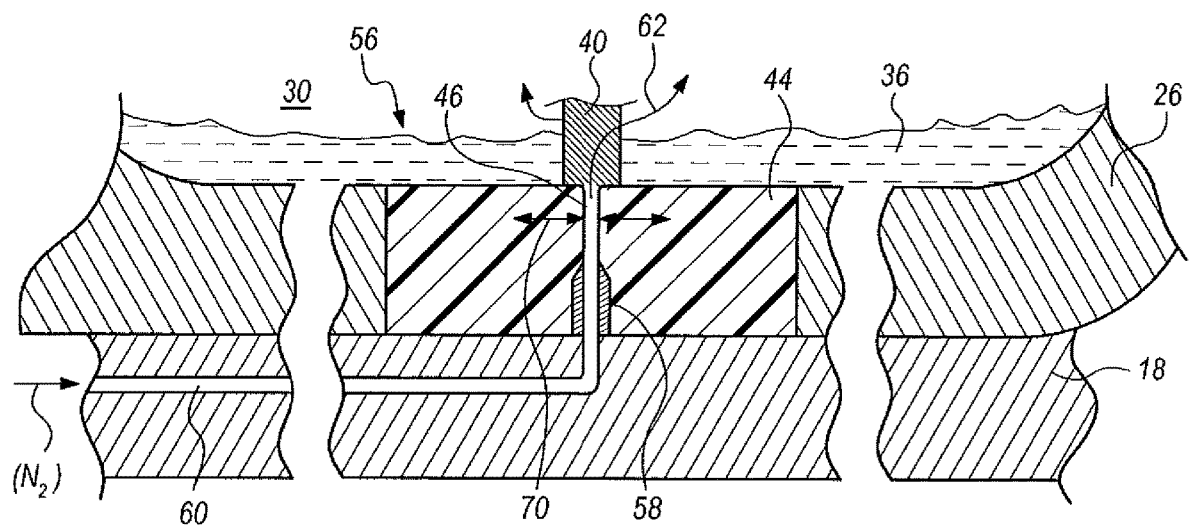
FIG. 5 is a sectional view and enlargement of the base of the container and support showing the resilient element having an orifice for delivering nitrogen into the container chamber.

Turning to FIG. 5, a detail of a controller 56 for regulating the rate of entry of gaseous nitrogen into chamber 30 of container 26 is shown. Controller 56 utilizes resilient element 44 having port or orifice 46 therethrough, prior described. An injector in the form of a nipple or nozzle 58, extending from support 18, has entered the port or orifice 46. A passageway 60 communicates with injector or nozzle 58 to allow the passage of gaseous nitrogen from canister 14 via conduit 16 and opened valve 17. That is to say, passageway 60 communicates with conduit 16 depicted in FIG. 1. The pressure of nitrogen gas traveling through conduit 16, passageway 60, and injector 58 expands or enlarges a portion of orifice or port 46 to allow a predetermined amount of nitrogen gas to pass into beverage 36 as indicated by directional arrows 62, FIGS. 4 and 5. In other words, entry of injector 58 into orifice or port 46 initiates the release of nitrogen gas into beverage 46 within container 26 and vice versa. Again, support 18, hingedly swinging from casing 12, initiates the flow of nitrogen gas through orifice 46.

Figure 6:
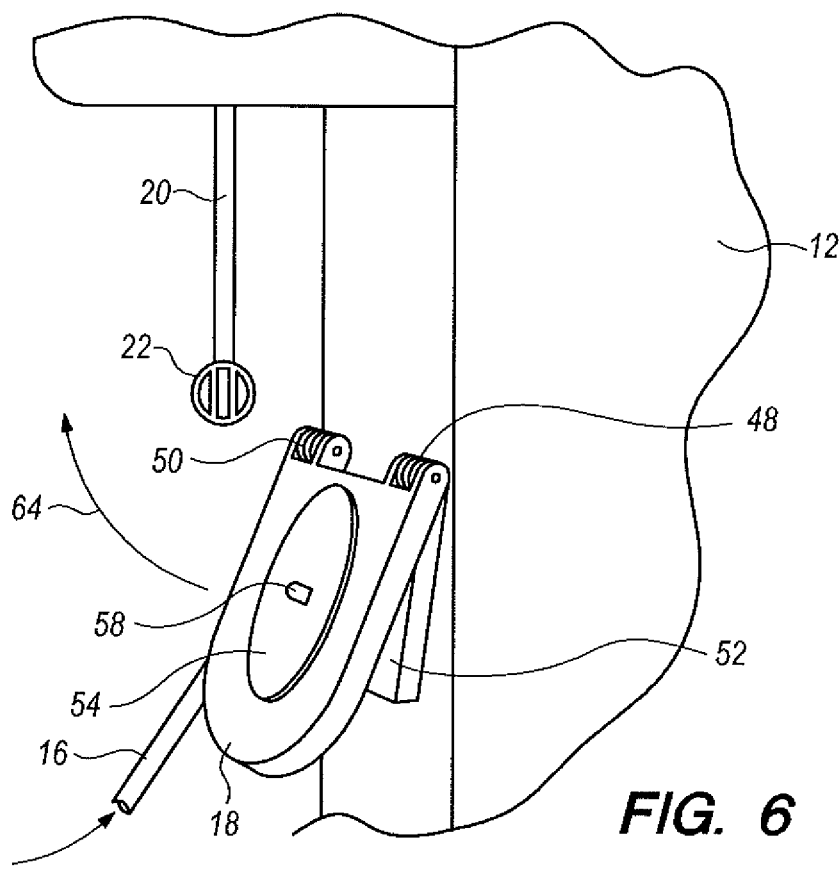
FIG. 6 is a right side perspective view of the housing holding the support for the container and for positioning the agitator in the form of an impeller.

FIG. 6 shows the relative positioning of agitator 20 and support 18 prior to the positioning of container 26 on support 18. Directional arrow 64 indicates the hinged motion of support 18 when container 26 lies upon support 18 and within disc-shaped depression 54.

Figure 7:
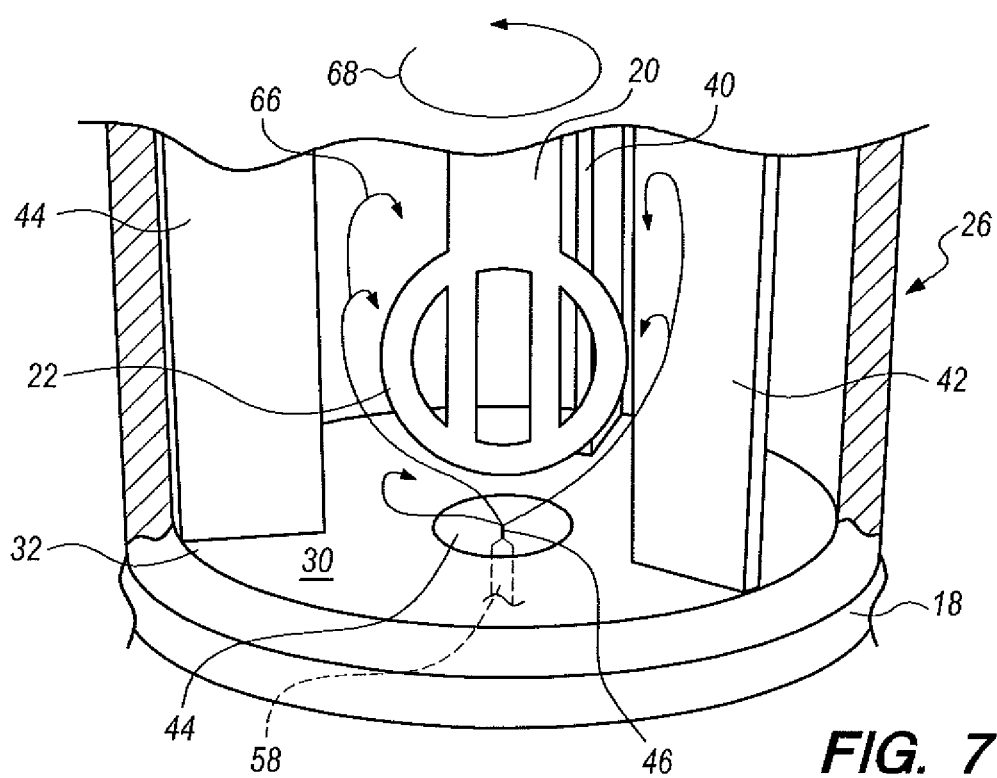
FIG. 7 is a cutaway perspective view showing the end portion of the impeller, a trio of baffles, and the resilient element providing an orifice through the base of the container.

FIG. 7 reveals the positioning of rotator tip of agitator 20 in relation to baffles 40, 42, and 44. Directional arrows 66 represent the movement of nitrogen gas within chamber 30 of container 26 and the shearing of beverage 34, indicated by directional arrow 68. It should be realized that the shearing of beverage 34 within container 26 avoids vortex formation and ensuing cavitation, which will draw ambient air containing oxygen and carbon dioxide into beverage 36 found in container 30. As a result, only gaseous nitrogen is delivered through conduit 16, passageway 60, injector 58, and orifice or port 46. It may be apparent that retraction of injector 58 will allow resilient element 44 to close orifice 46, directional arrows 70, FIG. 5.

In operation, the user places nitrogen gas canister 14 within casing 12 and opens the outlet thereto to allow the nitrogen gas to flow through conduit 16. The opening of nitrogen gas canister 14 is achieved by conventional known valving. Valve 17 is also opened at this juncture. Support 18 is then swung upwardly by the use of hinges 48 and 50 which may be spring actuated. Optional brace 52 is then placed below support 18 to hold support 18 in a relatively horizontal position. Container 12 holding beverage 36, which may be cold brew coffee, is then placed within disc-shaped depression 54 of support 18 such that injector 18 mates with port or orifice 46 of resilient element 44 found in base 32 of container 26. Beverage 36 may be poured into container 26 before or after the engagement of support 52 with container 26. Agitator 20, having an impeller tip 22, is then activated to a preset level to create a shearing effect on beverage 36. The control of agitator 20, and the presence of baffles 40, 42, and 44 in chamber 30 avoids the creation of a cavitation. Thus, the infusion of ambient air containing oxygen, carbon dioxide, and other gases is avoided by such prevention cavitation. As heretofore stated, controller 25, operating the rotational speed of agitator 20, is adjusted to create a proper revolutions per minute of impeller 22 in combination with the quantity of nitrogen gas entering the chamber 30 of container 26 via conduit 16, passageway 60, injector 58, and slightly opened orifice 46 of resilient element 44. Directional arrows 70 on FIG. 5 show the opening and closing influence of nitrogen gas on orifice 46 emanating from injector 58. The resulting drink, in the case of cold brewed coffee, is one that is perceived as being creamier and sweeter and is quite appealing to persons imbibing the same.

While in the foregoing embodiments of the application have been set forth in considerable detail for the purposes of making a complete disclosure of the application it may be apparent to those of skill in the art that numerous changes may be made in such details without departing from the spirit and principles of the application.

What is claimed is:

1. An apparatus for infusing gaseous nitrogen from a source into a beverage, comprising:
    a container, said container comprising a chamber for the beverage, said container being formed by a base and a side portion extending therefrom;
    at least one baffle located in said chamber and are positioned along said side portion of said container;
    a port located in said base of said container, said port permitting the passage of a gaseous nitrogen from said source to said chamber of said container;
    an agitator, said agitator creating a shear force on the beverage in said chamber of said container, said agitator being located adjacent said port and said at least one baffle;
    a first controller for regulating the activity of said agitator, and a second controller for regulating the rate of entry of the gaseous nitrogen into said chamber of said container; and
    a support for said container, said support including an injector communicating with said port located in the base of said container and the source of nitrogen.

2. The apparatus of claim 1 in which said at least one baffle comprises a plurality of baffles.

3. The apparatus of claim 1 which further comprises a housing, said support being connected to said housing.

4. The apparatus of claim 3 in which said support is rotatably connected to said housing.

5. The apparatus of claim 1 in which said agitator is supported by said housing.

6. The apparatus of claim 1 in which said agitator comprises an impeller.

7. The apparatus of claim 1 in which said port of said container comprises an element of resilient material, said element including said port as an orifice being capable of enlarging under pressure of the gaseous nitrogen from said source and collapsing in the absence of the gaseous nitrogen from the source.

8. The apparatus of claim 7 in which said at least one baffle comprises a plurality of baffles.

9. The apparatus of claim 7 which further comprises a housing, said support being connected to said housing.

10. The apparatus of claim 9 in which said support is rotatably connected to said housing.

11. The apparatus of claim 7 in which said agitator is supported by said housing.

12. The apparatus of claim 7 in which said agitator comprises an impeller.

13. The apparatus of claim 7 in which said injector comprises a nozzle.

* * * * *